(12) United States Patent
Oyama (10) Patent No.: US 11,560,074 B2
(45) Date of Patent: Jan. 24, 2023

(54) VEHICLE SEAT, METHOD FOR MOUNTING AUXILIARY SEAT, AND STRUCTURE FOR MOUNTING AUXILIARY SEAT

(71) Applicant: HONDA MOTOR CO., LTD., Tokyo (JP)

(72) Inventor: Rikiya Oyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/391,027

(22) Filed: Aug. 2, 2021

(65) Prior Publication Data

US 2022/0063456 A1 Mar. 3, 2022

(30) Foreign Application Priority Data

Aug. 26, 2020 (JP) .............................. JP2020-142384

(51) Int. Cl.
*B60N 2/28* (2006.01)
*B61D 1/04* (2006.01)
*B60N 2/30* (2006.01)
*B60N 2/005* (2006.01)

(52) U.S. Cl.
CPC ............. *B60N 2/289* (2013.01); *B60N 2/286* (2013.01); *B60N 2/005* (2013.01); *B60N 2/3081* (2013.01); *B60N 2/3084* (2013.01); *B60N 2/3086* (2013.01); *B60N 2205/30* (2013.01); *B61D 1/04* (2013.01)

(58) Field of Classification Search
CPC ...... B60N 2/286; B60N 2/289; B60N 2/3081; B60N 2/3084; B60N 2/3086; B60N 2/005; B60N 2205/30; B60N 2205/35; B61D 1/04
See application file for complete search history.

(56) References Cited

U.S. PATENT DOCUMENTS

| 5,290,090 A | * | 3/1994 | Bell | ....................... B60N 2/3084 297/238 |
| 6,254,183 B1 | * | 7/2001 | Bian | ....................... B60N 2/286 297/219.12 |

FOREIGN PATENT DOCUMENTS

| JP | S63103353 U | 7/1988 |
| JP | H653276 U | 7/1994 |
| JP | 2001270360 A | 10/2001 |

* cited by examiner

*Primary Examiner* — Syed A Islam
(74) *Attorney, Agent, or Firm* — CKC & Partners Co., LLC (57) ABSTRACT

A vehicle seat includes a seat face part, a back face part, and a fixing member for fixing an auxiliary seat, which is disposed between the seat face part and the back face part. The seat face part includes a seat face recess capable of housing a lower face side of a seat part of an auxiliary seat, and a seat face cushion that is detachably attached to the seat face recess. The back face part includes a back face recess capable of housing a rear face side of a back part of the auxiliary seat, and a back face cushion that is detachably attached to the back face recess.

6 Claims, 11 Drawing Sheets

VEHICLE SEAT, METHOD FOR MOUNTING AUXILIARY SEAT, AND STRUCTURE FOR MOUNTING AUXILIARY SEAT

This application is based on and claims the benefit of priority from Japanese Patent Application 2020-142334, filed on 26 Aug. 2020, the content of which is incorporated herein by reference.

BACKGROUND OF THE INVENTION

Field of the Invention

The present invention relates to a vehicle seat, a method for mounting an auxiliary seat, and a structure for mounting an auxiliary seat.

Related Art

When an infant is seated in a vehicle such as an automobile, an auxiliary seat such as a child seat is used. The auxiliary seat is fixed by engaging a fixing connector provided on the auxiliary seat with an anchor for fixing an auxiliary seat, which was provided in advance between the seat face part and the back face part of the vehicle seat. As a result, the auxiliary seat is installed on the surfaces of the seat face part, and the back face part of the vehicle seat.

Conventionally, there has been known a seat structure in which cushions provided in the seat face part and the back face part of a vehicle seat are detachable (for example, see Patent Document 1).

Patent Document 1: Japanese Unexamined Utility Model Registration Application, Publication No. S63-103353

SUMMARY OF THE INVENTION

Since the seat face part and the back face part of the vehicle seat are provided with an adequate cushioning characteristic to provide a comfortable ride to the occupant, the mounting condition of the auxiliary seat installed on these surfaces is likely to be unstable. Moreover, the load of the auxiliary seat may cause settling and wear of the seat face part and the back face part, and the vehicle seat may be damaged by long-term use.

Patent Document 1 discloses a seat structure in which the cushions of the seat face part and the back face part are detachable, but does not disclose stable mounting of the auxiliary seat.

An object of the present invention is to provide a vehicle seat on which an auxiliary seat can be stably mounted, without causing settling or wear of cushions, a method for mounting the auxiliary seat, and a structure for mounting the auxiliary seat.

A first aspect of the present invention is a vehicle seat (e.g., the vehicle seat 1 described later), including: a seat face part (e.g., the seat face part 2 described later); a back face part (e.g., the back face part 3 described later); and a fixing member (e.g., the anchor 41 described later) for fixing an auxiliary seat, which is disposed between the seat face part and the back face part. The seat face part includes: a seat face recess (e.g., the seat face recess 22 described later) capable of housing a lower face side of a seat part, (e.g., the seat part 51 described later) of the auxiliary seat (e.g., the auxiliary seat 5 described later); and a seat face cushion (e.g., the seat face cushion 21 described later) that is detachably attached to the seat face recess. The back face part includes: a back face recess (e.g., the back face recess 32 described later) capable of housing a rear face side of a back part (e.g., the back part 52 described later) of the auxiliary seat; and a back face cushion (e.g., the back face cushion 31 described later) that is detachably attached to the back face recess.

In a second aspect of the present invention according to the first aspect, the auxiliary seat may include: a lower face protrusion (e.g., the lower face protrusion 54 described later) that protrudes downward from the seat part and in a trapezoidal shape; and a rear face protrusion (e.g., the rear face protrusion 55 described later) that protrudes rearward from the back part and in a trapezoidal shape. The seat face recess and the back face recess each may have a trapezoidal shape that reduces in size in a direction toward a bottom, corresponding to the trapezoidal shape of each of the lower face protrusion and the rear face protrusion.

In a third aspect of the present invention according to the second aspect, the lower face protrusion of the auxiliary seat may include: a first protrusion (e.g., the first protrusion 54a described later); and a second protrusion (e.g., the second protrusion 54b described later) having a higher protrusion height than that of the first protrusion. The seat face recess may include: a first recess (e.g., the first recess 22a described later) capable of housing the first protrusion; and a second recess (e.g., the second recess 22b described later) capable of housing the second protrusion. In a fourth aspect of the present invention according to the third aspect, the second protrusion may be disposed on a rear side of the first protrusion, and the second recess may be disposed on a rear side of the first recess.

In a fifth aspect of the present invention according to the fourth aspect, the second protrusion may include an inclined front face (e.g., the inclined front face 54c described later), which inclines rearward in a downward direction, on a front side. The second recess may include an inclined wall face (e.g., the inclined wall face 22c described later), which inclines rearward in a direction toward the bottom, on a front side, corresponding to the inclined front face.

A sixth aspect of the present invention is a method for mounting an auxiliary seat (e.g., the auxiliary seat 5 described later) including: a seat part (e.g., the seat part 51 described later); a back part (e.g., the back part 52 described later); and a connector (e.g., the connector 53 described later) connected to a fixing member, on a vehicle seat (e.g., the vehicle seat 1 described later) including: a seat face part (e.g., the seat face part 2 described later); a back face part (e.g., the back face part 3 described later); and the fixing member (e.g., the anchor 41 described later) for fixing the auxiliary seat, the fixing member being disposed between the seat face part and the back face part. The seat face part of the vehicle seat includes: a seat face recess (e.g., the seat face recess 22 described later) capable of housing a lower face side of the seat part of the auxiliary seat; and a seat face cushion (e.g., the seat face cushion 21 described later) that is detachably attached to the seat face recess. The back face part of the vehicle seat includes: a back face recess (e.g., the back face recess 32 described later) capable of housing a rear face side of the back part of the auxiliary seat; and a back face cushion (e.g., the back face cushion 31 described later) that is detachably attached to the back face recess. The method includes: detaching the seat face cushion and the back face cushion of the vehicle seat respectively from the seat face part and the back face part; positioning to house the lower face side of the seat part of the auxiliary seat in the seat face recess of the seat face part; connecting the connector of the auxiliary seat to the fixing member of the vehicle seat; and positioning to house the rear face side of the back part of the auxiliary seat in the back face recess of the back face part of the vehicle seat.

A seventh aspect of the present invention is a structure for mounting an auxiliary seat (e.g., the auxiliary seat 5 described later) including: a seat part (e.g., the seat part 51 described later); a back part (e.g., the back part 52 described later); and a connector (e.g., the connector 53 described later) connected to a fixing member, on a vehicle seat (e.g., the vehicle seat 1 described later), including: a seat face part (e.g., the seat face part 2 described later); a back face part (e.g., the back face part 3 described later); and the fixing member (e.g., the anchor 41 described later) for fixing the auxiliary seat, the fixing member being disposed between the seat face part and the back face part. The seat face part of the vehicle seat, includes a seat face recess (e.g., the seat face recess 22 described later) capable of housing a lower face side of the seat part of the auxiliary seat. The back face part of the vehicle seat includes a back face recess (e.g., the back face recess 32 described later) capable of housing a rear face side of the back part of the auxiliary seat. The auxiliary seat is fixed to the vehicle seat by respectively housing the lower face side of the seat part and the rear face side of the back part of the auxiliary seat in the seat face recess and the back face recess of the vehicle seat and connecting the connector of the auxiliary seat to the fixing member of the vehicle seat.

According to the first aspect, the auxiliary seat can be mounted on the vehicle seat by housing the lower face side and the rear face side of the auxiliary seat in the seat face recess of the seat face part and the back face recess of the back face part from which the seat, face cushion and the back face cushion are respectively detached, so that the auxiliary seat can be stably mounted on the vehicle seat without causing settling and wear of the cushions.

According to the second aspect, the trapezoidal lower face protrusion and rear face protrusion of the auxiliary seat are housed in the trapezoidal seat, face recess and back face recess of the vehicle seat, and thus the auxiliary seat can be easily positioned in the proper position of the vehicle seat, and can be securely fixed without rattling in the up-down, front-rear, and left-right directions.

According to the third aspect, the second protrusion of the lower face protrusion of the auxiliary seat is housed in the second recess of the seat face recess of the vehicle seat, so that the auxiliary seat can be more securely fixed.

According to the fourth aspect, the lower face protrusion of the auxiliary seat can be more stably housed in the seat face recess of the vehicle seat.

According to the fifth aspect, when installing the auxiliary seat, the inclined front face of the auxiliary seat is slid along the inclined wall face of the vehicle seat, so that the second protrusion of the lower face protrusion of the auxiliary seat can be smoothly guided to the second recess of the seat face recess of the vehicle seat. Thus, the positioning of the auxiliary seat can be performed more easily.

According to the sixth aspect, the auxiliary seat can be mounted on the vehicle seat by housing the lower face side and the rear face side of the auxiliary seat in the seat face recess and the back face recess of the vehicle seat from which the seat face cushion and the back face cushion are respectively detached, so that the auxiliary seat can be stably mounted on the vehicle seat without causing settling and wear of the cushions.

According to the seventh aspect, since the auxiliary seat is mounted on the the vehicle seat by housing the lower face side and the rear face side of the auxiliary seat in the seat face recess and the back face recess of the vehicle seat, so that the auxiliary seat can be stably mounted on the vehicle seat.

DETAILED DESCRIPTION OF THE INVENTION

Figure 1:
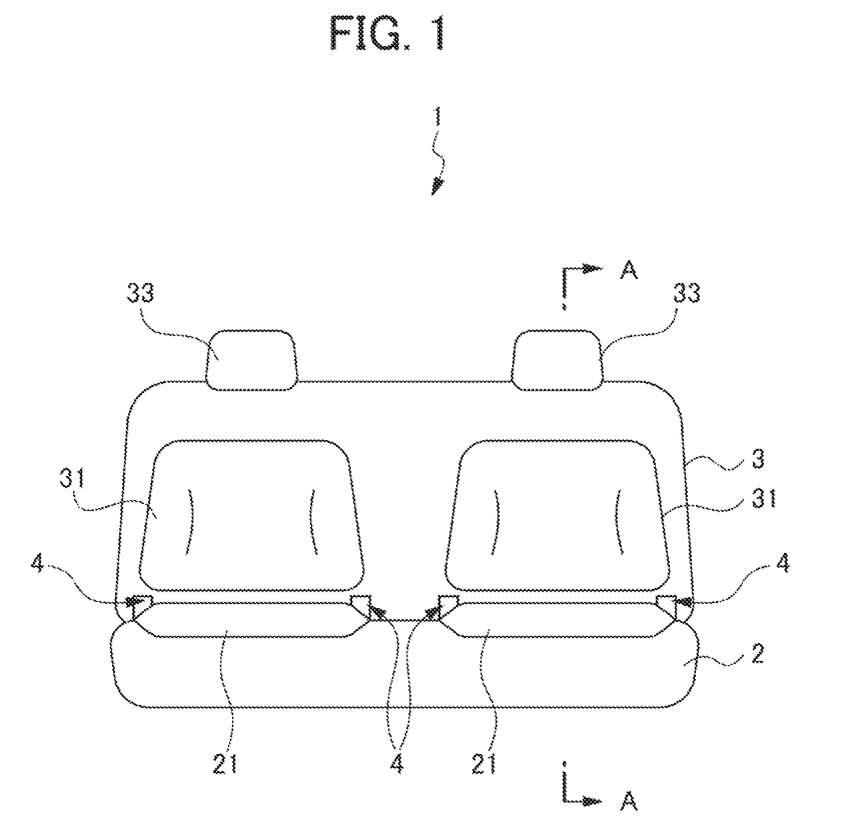
FIG. 1 is a front view of a vehicle seat.

Hereinafter, embodiments of the present invention will be described in detail with reference to the drawings. A vehicle seat 1 of the present embodiment shown in FIG. 1 is a rear seat (second row seat) of an automobile, and includes a seat face part 2 that supports the buttocks of an occupant to be seated, and a back face part 3 that supports the back of the occupant to be seated.

Two occupants can be seated on the vehicle seat 1 of the present embodiment. In the seat face part 2 and the back face part 3, two seat face cushions 21 and two back face cushions 31 that are respectively disposed corresponding to the seating positions of the occupants are provided separately from the seat face part 2 and the back face part 3.

Figure 2:
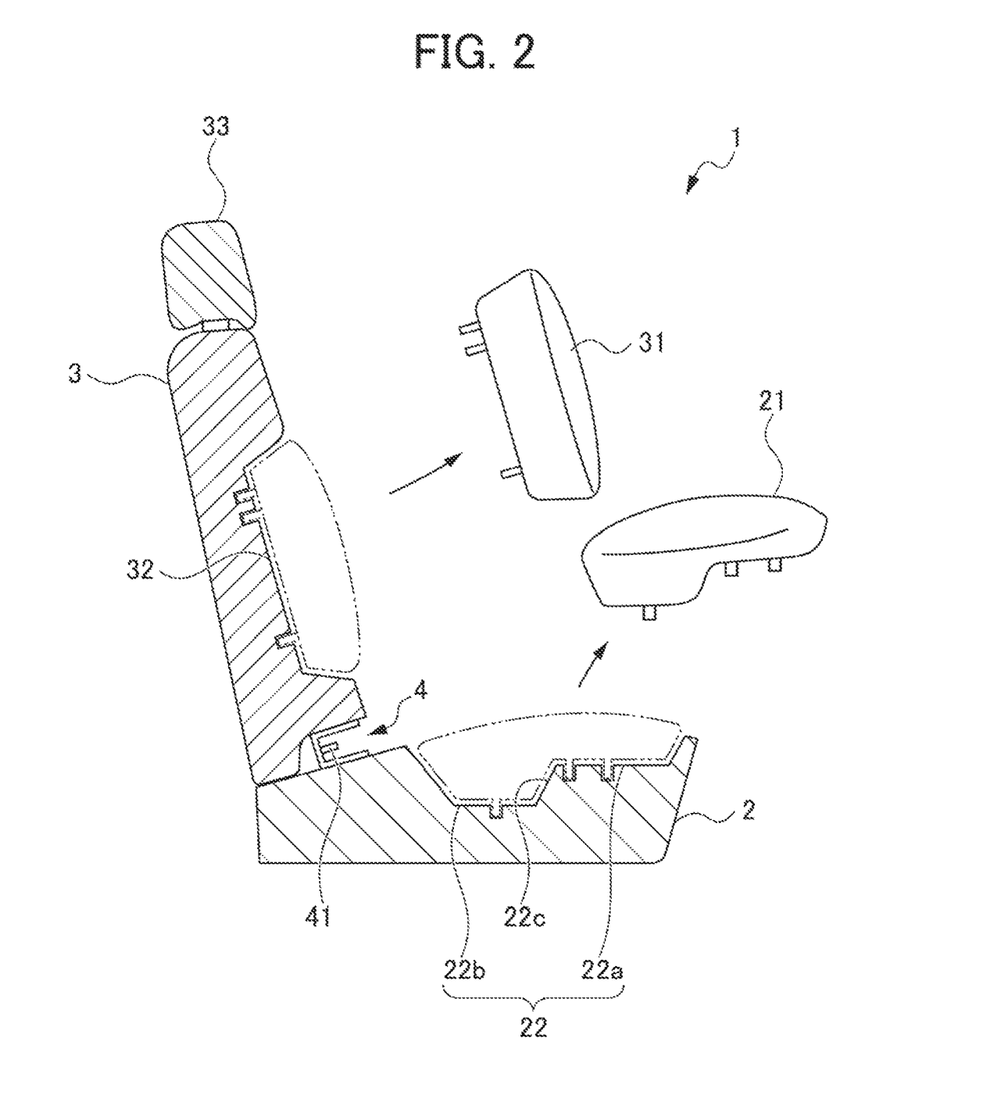
FIG. 2 is a cross-sectional view taken along line A-A in FIG. 1.
Figure 3:
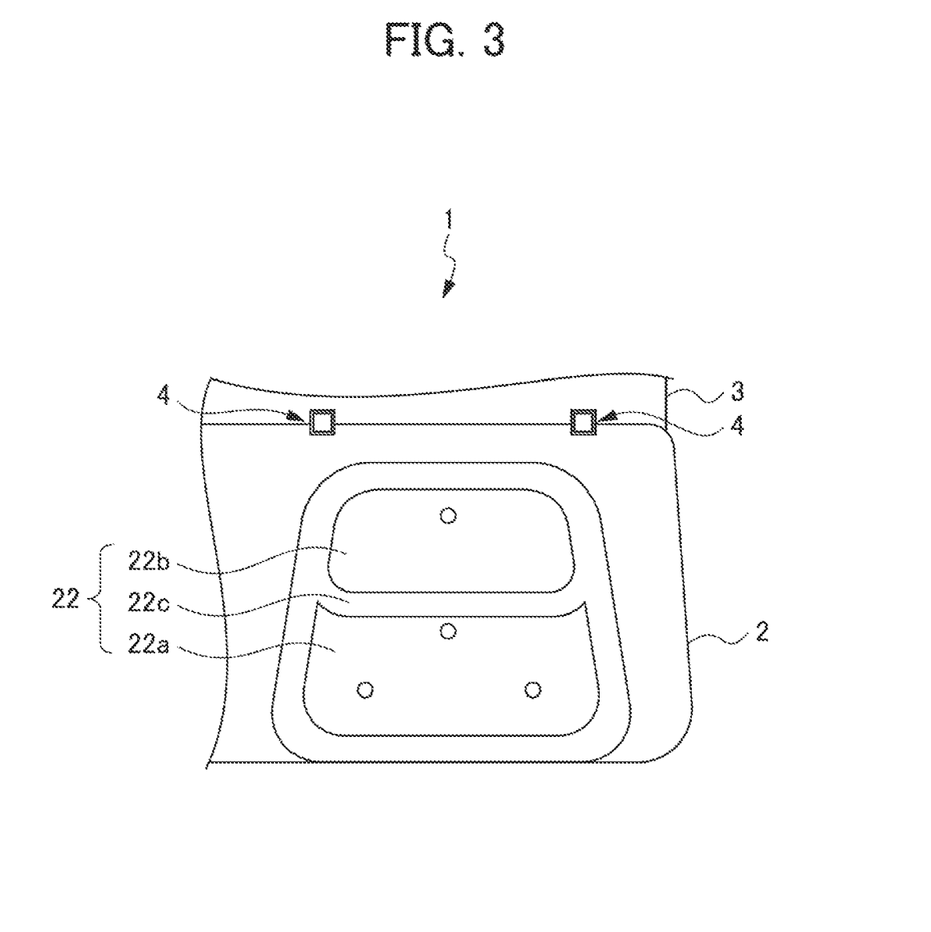
FIG. 3 is a plan view showing a seat face part of the vehicle seat from which a seat face cushion is detached.
Figure 4:
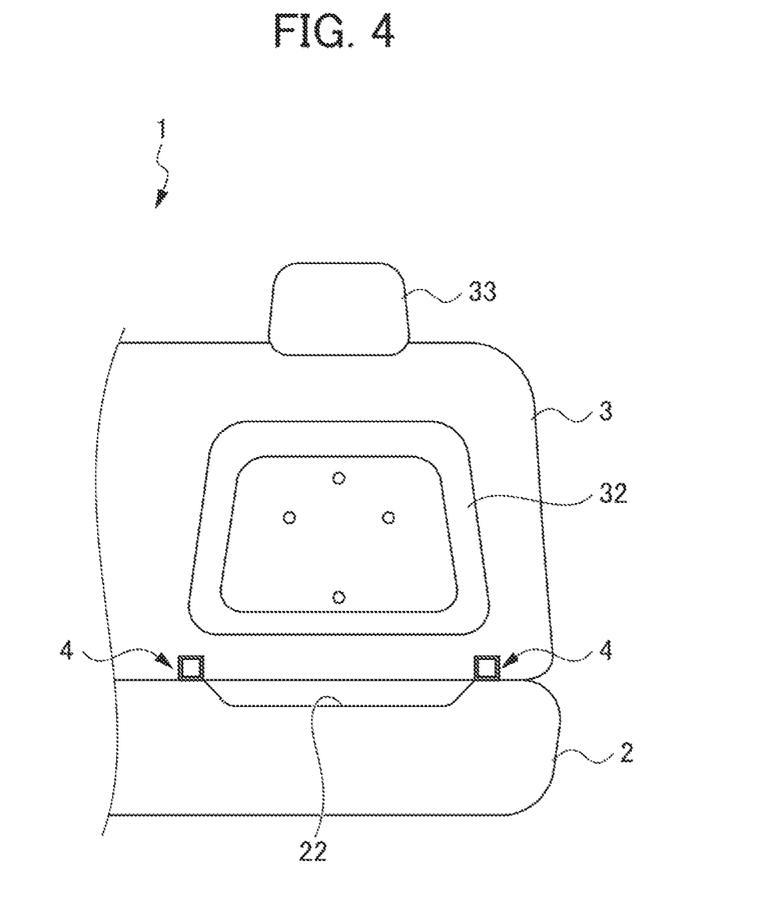
FIG. 4 is a front view showing a back face part of the vehicle seat from which a back face cushion is detached.

Specifically, as shown in FIGS. 2, 3, and 4, a seat face recess 22 formed in a recessed shape from the surface is provided in the seat face part 2. A back face recess 32 formed in a recessed shape from the surface is provided in the back face part 3. The seat face cushion 21 and the back face cushion 31 are detachably attached by fitting into the seat face recess 22 and the back face recess 32, respectively. A headrest 33 is detachably provided above the back face part 3.

The seat face cushion 21 and the back face cushion 31 each have an adequate cushioning characteristic for providing a comfortable ride to the occupant. In contrast, the seat face part 2 and the back face part 3 are stiffer than the seat face cushion 21 and the back face cushion 31. Therefore, the seat face cushion 21 and the back face cushion 31 fitted into the seat face recess 22 and the back face recess 32, respectively, are stably supported by the stiffer seat face part 2 and back face part 3.

Between the seat face part 2 and the back face part 3, a fixing member housing part 4 for housing a fixing member for fixing an auxiliary seat is disposed. Two fixing member housing parts 4 are provided to a pair of the seat cushion 21 and the back cushion 31 so as to sandwich the seat cushion 21 and the back cushion 31 between them.

As shown in FIG. 2, the fixing member housing part 4 houses an anchor 41 in the interior. The anchor 41 is a metal fixing member for fixing an auxiliary seat 5 to the vehicle seat 1 by connecting the anchor 41 to a connector 53 provided in the auxiliary seat 5 described later. The anchor 41 of the present embodiment is configured by ISOFIX, an international standard for a system of fixing an auxiliary seat to a vehicle seat.

Figure 5:
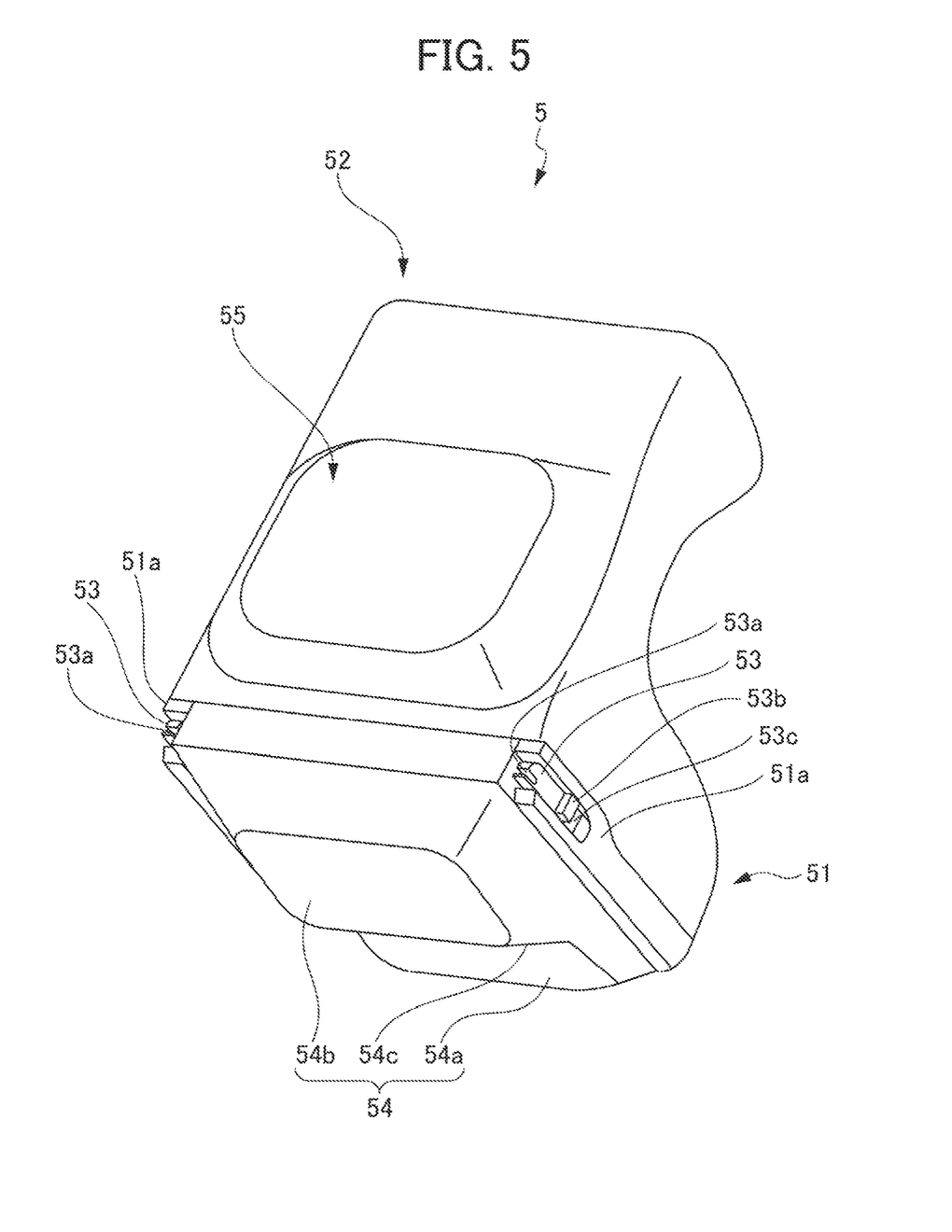
FIG. 5 is a perspective view of an auxiliary seat to be mounted on the vehicle seat viewed from the back face side.
Figure 6:
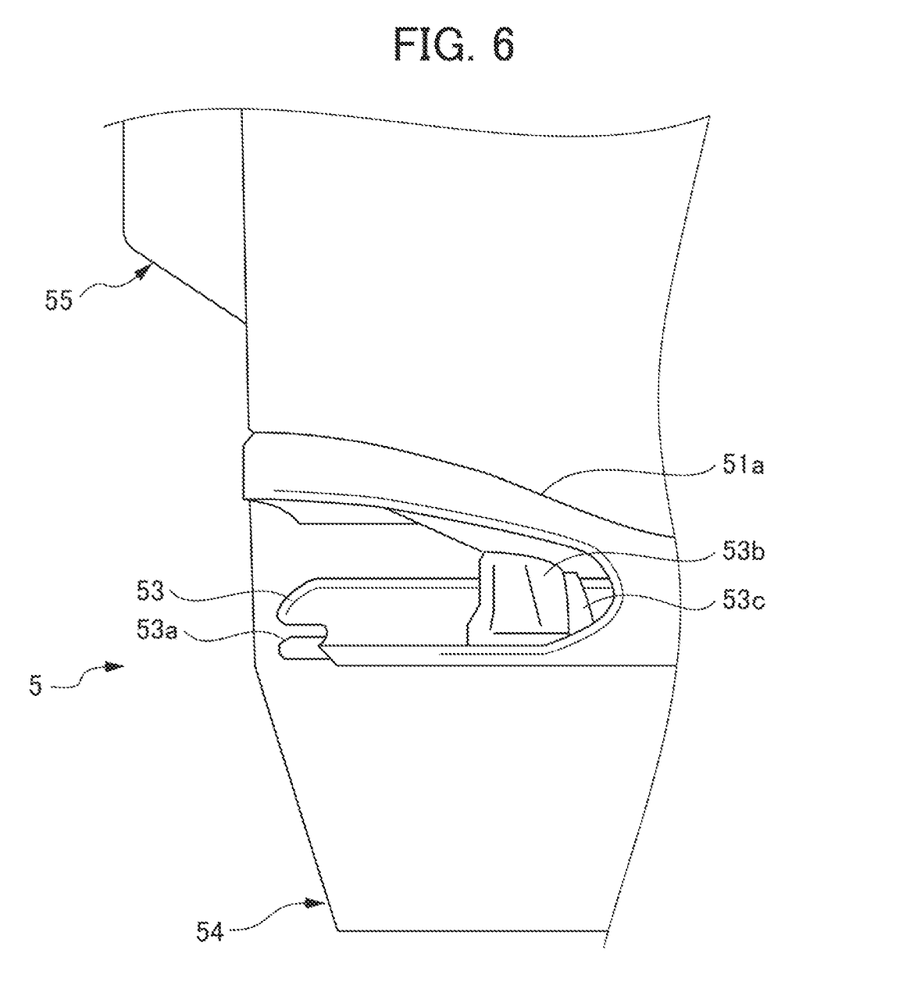
FIG. 6 is an enlarged side view of a connector of the auxiliary seat.

Next, the auxiliary seat 5 mounted on the vehicle seat 1 will be described with reference to FIGS. 5 and 6. The auxiliary seat 5 is, for example, a child seat, and includes a seat part 51 that supports the buttocks and legs of the occupant, a back part 52 that supports the back and head of the occupant, and a connector 53 for connecting to the anchor 41 provided in the vehicle seat 1. The connectors 53 are respectively disposed on both sides of the seat part 51 corresponding to two anchors 41, 41.

The connector 53 is formed in an arm shape elongated in the front-rear direction of the auxiliary seat 5, and includes a hook 53a at the leading end that can be locked with respect to the anchor 41. Note that, with regard to the front-rear direction of the auxiliary seat 5, the front face direction of the occupant of the auxiliary seat 5 is the front, and the back face direction of the occupant is the rear. The connectors 53 are housed in frames 51a disposed on both sides of the seat part 51 and extending along the front-rear direction of the auxiliary seat 5 so as to advance and retreat toward the rear. The connector 53 includes an operation part 53b for operating advancing and retreating, and a safety button 53c indicating whether the hook 53a is locked with respect to the anchor 41.

On the lower face side of the seat part 51 of the auxiliary seat 5, a lower face protrusion 54 is provided which protrudes downward from substantially the entire lower face of the seat part 51. The lower face protrusion 54 has a trapezoidal shape that gradually reduces in size in a downward direction.

The lower face protrusion 54 includes a first protrusion 54a and a second protrusion 54b. The downward protrusion height of the second protrusion 54b is higher than that of the first protrusion 54a. The second protrusion 54b is disposed on the rear side of the first protrusion 54a. As a result, the lower face protrusion 54 is formed in a stepped shape in which the rear side protrudes downward with respect to the front side. The second protrusion 54b includes an inclined front face 54c, which inclines rearward in a downward direction, on the front side leading to the first protrusion 54a.

On the rear face side of the back part 52 of the auxiliary seat 5, a rear face protrusion 55 that protrudes rearward from the back part 52 is provided. The rear face protrusion 55 is provided over substantially the entire width of the rear face of the back part 52. The rear face protrusion 55 has a trapezoidal shape that gradually reduces in size in a rearward direction.

Here, the shapes of the seat face recess 22 of the seat face part 2 and the back face recess 32 of the back face part 3 correspond to the shapes of the lower face protrusion 54 and the rear face protrusion 55 of the auxiliary seat 5, respectively. That is, as shown in FIGS. 2 and 3, the shape of the seat face recess 22 of the vehicle seat 1 has a trapezoidal shape that gradually reduces in size in a direction toward the bottom, corresponding to the trapezoidal shape of the lower face protrusion 54 of the auxiliary seat 5. Further, as shown in FIGS. 2 and 4, the shape of the back face recess 32 of the vehicle seat 1 has a trapezoidal shape that gradually reduces in size in a direction toward the bottom, corresponding to the trapezoidal shape of the rear face protrusion 55 of the auxiliary seat 5.

More specifically, the seat face recess 22 includes a first recess 22a corresponding to the first protrusion 54a of the lower face protrusion 54 and a second recess 22b corresponding to the second protrusion 54b and deeper than the first recess 22a. In the seat face recess 22, the second recess 22b is disposed on the rear side of the first recess 22a. Thus, the seat face recess 22 is formed in a stepped shape in which the rear side is recessed further downward with respect to the front side. The second recess 22b includes an inclined wall face 22c that inclines rearward in a direction toward the bottom, corresponding to the inclined front face 54c of the lower face protrusion 54 of the auxiliary seat 5, on the front side leading to the first recess 22a.

Next, a method and a structure for mounting the auxiliary seat 5 to the vehicle seat 1 will be described with reference to FIGS. 2 and 7 to 11. First, as shown in FIG. 2, an operator detaches the seat face cushion 21 and the back face cushion 31, which are in the mounting position of the auxiliary seat 5, from the seat face part 2 and the back face part 3 of the vehicle seat 1, and exposes the seat face recess 22 and the back face recess 32. The headrest 33 is also detached.

Figure 7:
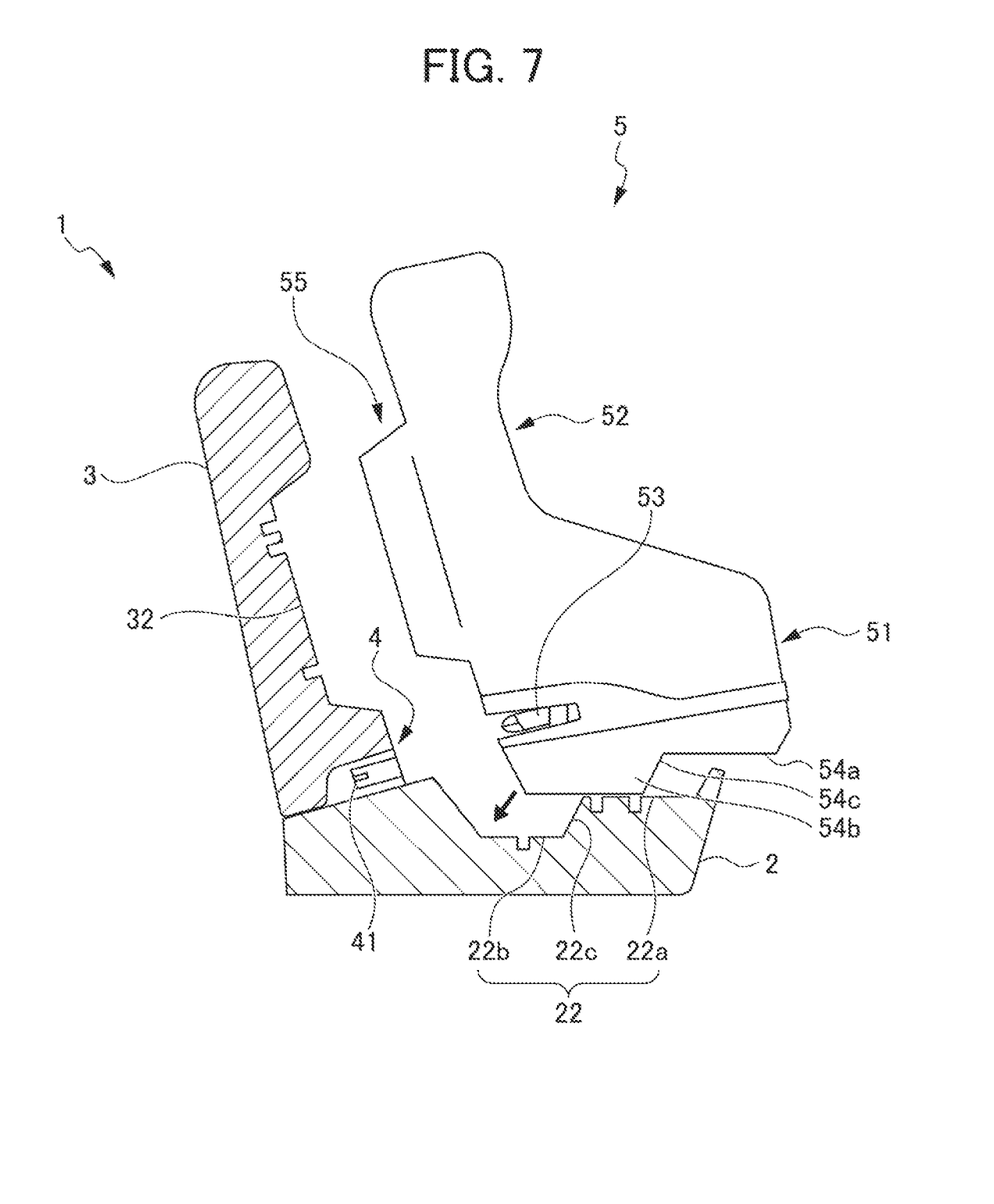
FIG. 7 is a diagram illustrating a method for mounting the auxiliary seat.

Next, as shown in FIG. 7, the operator aligns the lower face side of the seat part 51 of the auxiliary seat 5 with the seat face recess 22 of the seat face part 2 in a posture in which the back part 52 side of the auxiliary seat 5 faces rearward, to house the lower face side in the seat face recess 22. Specifically, the operator aligns the second protrusion 54b of the lower face protrusion 54 of the auxiliary seat 5 with the second recess 22b of the seat face recess 22, to house the second protrusion 54b in the second recess 22b. At this time, the inclined front face 54c disposed on the front side of the second protrusion 54b makes contact with the inclined wall face 22c disposed on the front side of the second recess 22b. Therefore, the lower face protrusion 54 of the auxiliary seat 5 is guided downward along the inclined wall face 22c, and is easily aligned with and fitted into the seat face recess 22. Thus, the first protrusion 54a and the second protrusion 54b of the lower face protrusion 54 are smoothly housed in the first recess 22a and the second recess 22b of the seat face recess 22, respectively.

Figure 8:
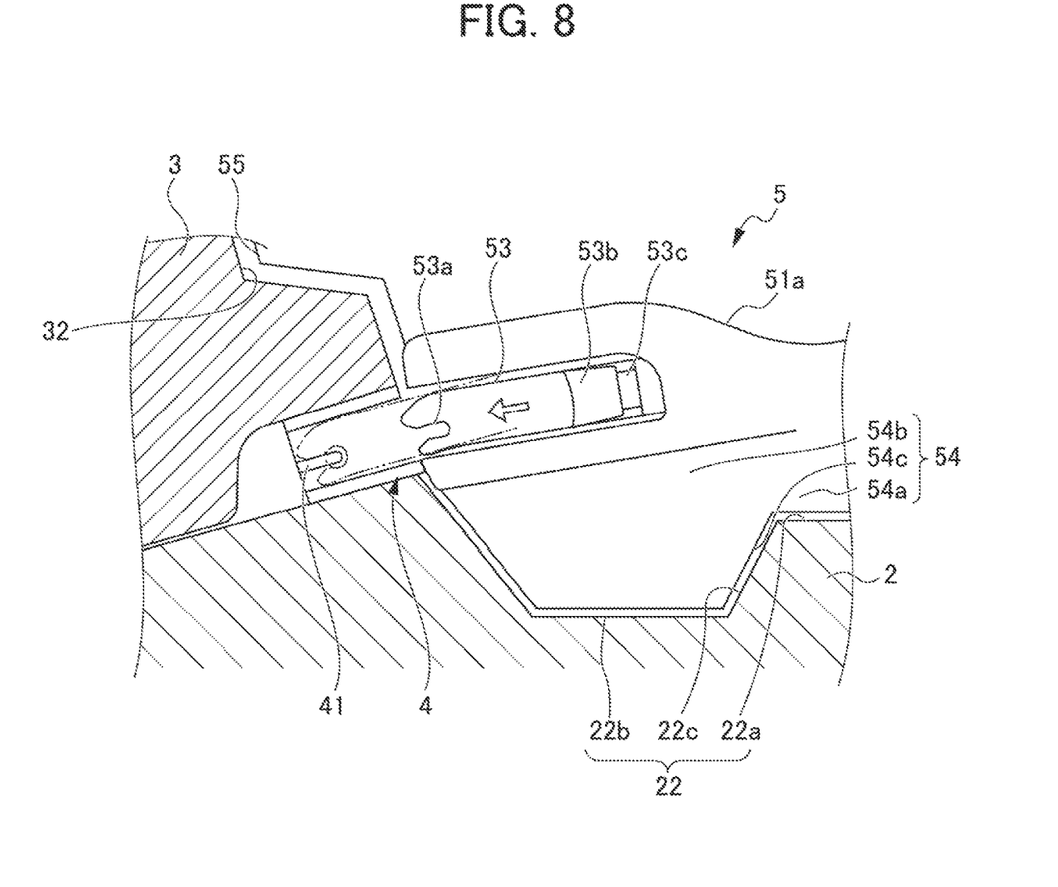
FIG. 8 is a diagram illustrating the method for mounting the auxiliary seat.

When the lower face protrusion 54 of the auxiliary seat 5 is housed in the seat face recess 22, the connector 53 of the auxiliary seat 5 is disposed in front of the fixing member housing part 4 of the vehicle seat 1. As shown in FIG. 8, the operator pinches the operation part 53b, moves the connector 53 so that it protrudes rearward, and inserts the connector 53 into the fixing member housing part 4. Thus, the hook 53a at the leading end of the connector 53 is connected in engagement with the anchor 41 in the fixing member housing part 4, and thus the auxiliary seat 5 is fixed to the vehicle seat 1.

Figure 9:
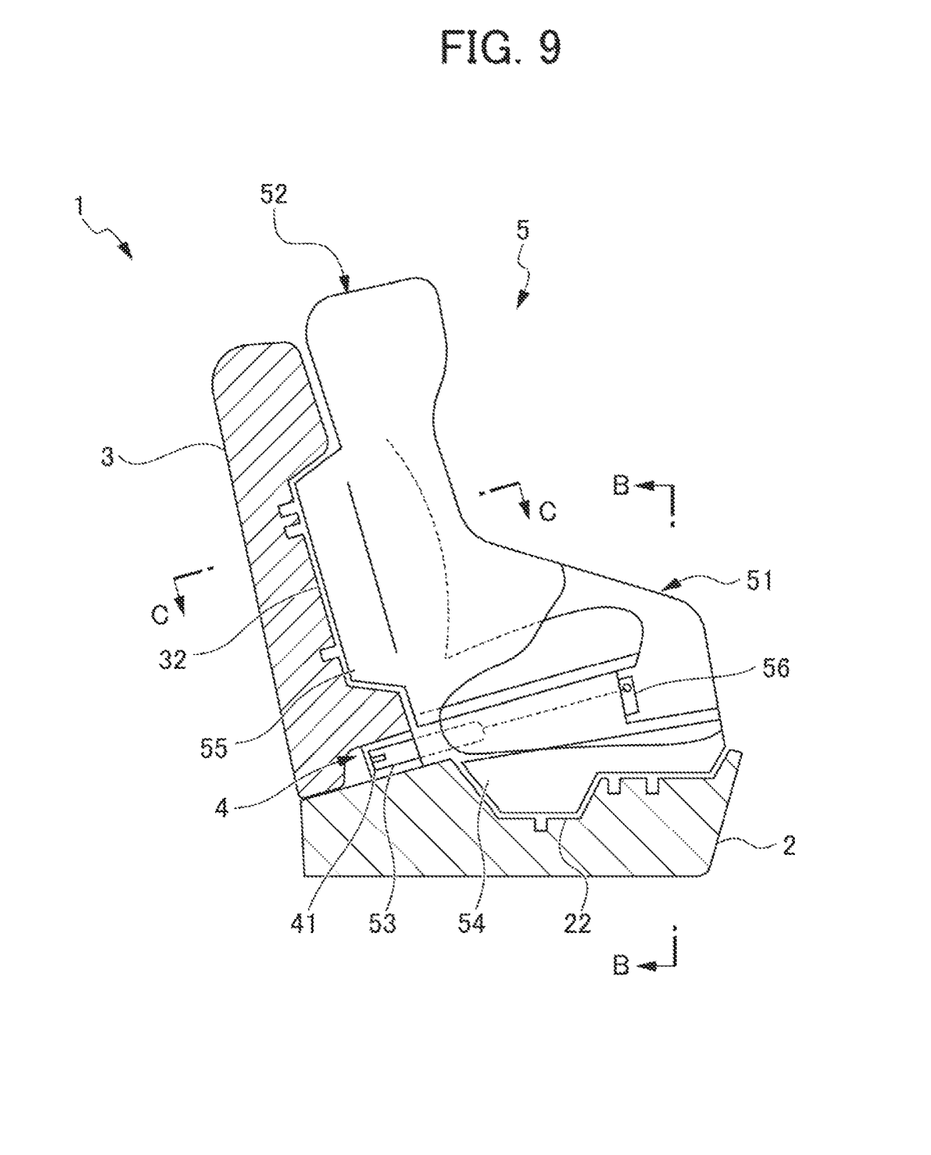
FIG. 9 is a diagram illustrating the method for mounting the auxiliary seat.

Thereafter, as shown in FIG. 9, the operator tilts the back part 52 of the auxiliary seat 5 rearward, aligns the rear face side of the back part 52 of the auxiliary seat 5 with the back face recess 32 of the back face part 3, to house the rear face side of the back part 52 in the back face recess 32. That is, the operator aligns the rear face protrusion 55 of the auxiliary seat 5 with the back face recess 32 of the vehicle seat 1, to house the rear face protrusion 55 in the back face recess 32.

As a result, the auxiliary seat 5 is fixed to the vehicle seat 1. The auxiliary seat 5 can be mounted on the vehicle seat 1 by housing the lower face side and the rear face side of the auxiliary seat 5 in the seat face recess 22 of the seat face part 2 and the back face recess 32 of the back face part 3 from which the seat face cushion 21 and the back face cushion 31 are detached, respectively, and thus the auxiliary seat 5 can be stably mounted on the vehicle seat 1 without causing settling and wear of the cushions.

Note that, for the mounting of the auxiliary seat 5, the positioning and housing of the lower face protrusion 54 of the auxiliary seat 5 in the seat face recess 22 and the positioning and housing of the rear face protrusion 55 of the auxiliary seat 5 in the back face recess 32 may be almost simultaneously performed, and subsequently the connector 53 may be connected to the anchor 41.

Figure 10:
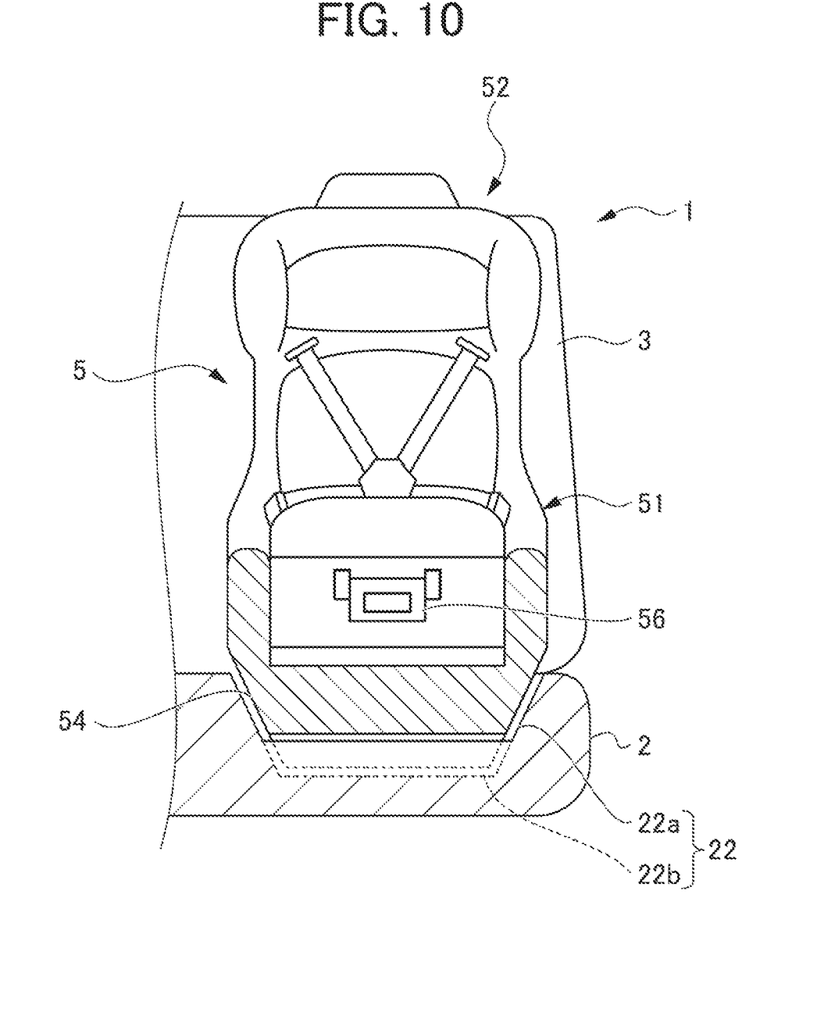
FIG. 10 is a cross-sectional view taken along line B-B in FIG. 9.
Figure 11:
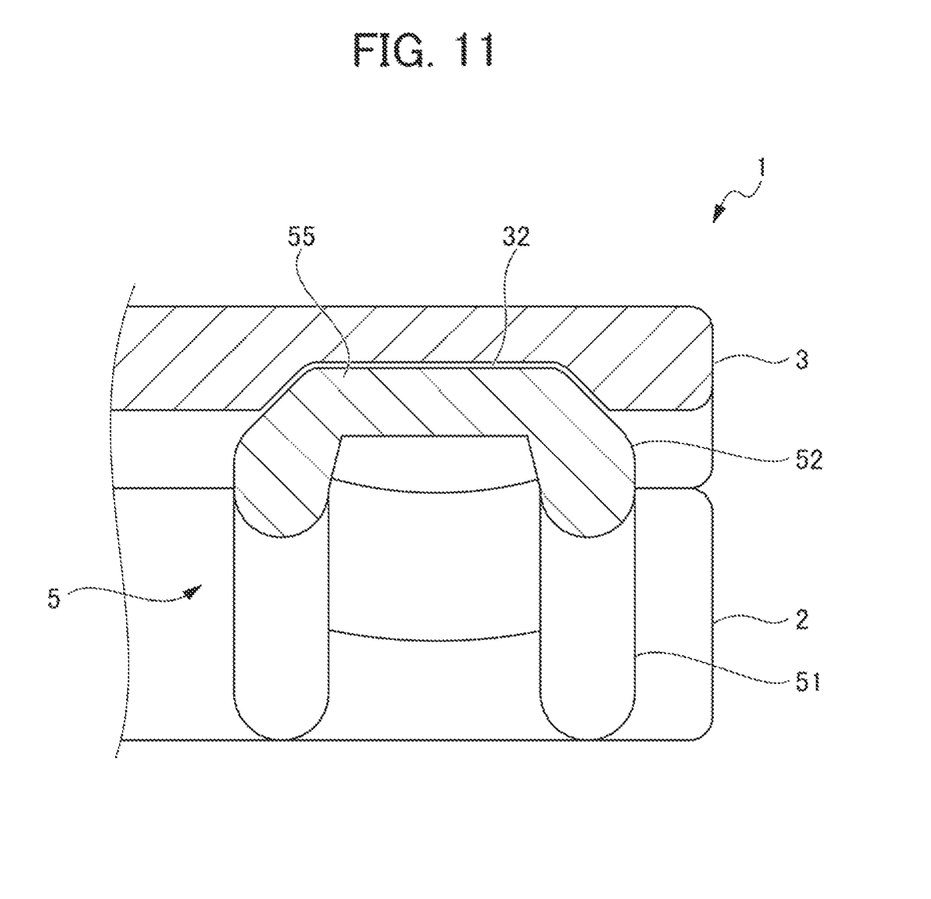
FIG. 11 is a cross-sectional view taken along line C-C in FIG. 9.

As shown in FIGS. 10 and 11, the trapezoidal lower face protrusion 54 and rear face protrusion 55 of the auxiliary seat 5 of the present embodiment are housed in the trapezoidal seat face recess 22 and back face recess 32 of the vehicle seat 1. Therefore, the auxiliary seat 5 is easily positioned in the proper position of the vehicle seat 1. Moreover, the lower face protrusion 54 of the auxiliary seat 5 is securely fixed without rattling in the front-rear and left-right directions, and the rear face protrusion 55 of the auxiliary seat 5 is securely fixed without rattling in the up-down and left-right directions.

Further, since the second protrusion 54b of the lower face protrusion 54 of the auxiliary seat 5 of the present embodiment is housed in the second recess 22b of the seat face recess 22 of the vehicle seat 1, the auxiliary seat 5 is more securely fixed to the vehicle seat 1.

Note that, when detaching the auxiliary seat 5 from the vehicle seat 1, the operator operates a release lever 56 (see FIGS. 9 and 10) provided on the front face of the seat part 51 of the auxiliary seat 5, and thereby releases the connection between the connector 53 of the auxiliary seat 5 and the anchor 41 of the vehicle seat 1.

The second protrusion 54b of the auxiliary seat 5 of the present embodiment is disposed on the rear side of the first protrusion 54a, and the second recess 22b of the seat face recess 22 of the vehicle seat 1 is disposed on the rear side of the first recess 22a, so that the lower face protrusion 54 of the auxiliary seat 5 is more securely housed in the seat face recess 22 of the vehicle seat 1.

Further, the second protrusion 54b of the lower face protrusion 54 of the present embodiment includes the inclined front face 54c, which inclines rearward in a downward direction, on the front side, and the second recess 22b of the seat face recess 22 includes the inclined wall face 22c, which inclines rearward in a direction toward the bottom, on the front side, corresponding to the inclined front face 54c. Therefore, when installing the auxiliary seat 5, the inclined front face 54c of the auxiliary seat 5 is slid along the inclined wall face 22c of the vehicle seat 1, so that the second protrusion 54b of the lower face protrusion 54 of the auxiliary seat 5 can be smoothly guided to the second recess 22b of the seat face recess 22 of the vehicle seat 1. Thus, the positioning of the auxiliary seat 5 can be performed more easily.

Although the seat face cushion 21 and the back face cushion 31 of the vehicle seat 1 of the present embodiment are configured separately, the seat face cushion and the back face cushion may be integrally configured. Further, the constitution of the vehicle seat 1 in which the auxiliary seat 5 can be mounted is applicable not only to a rear seat of an automobile but also to all seats except the driver's seat of an automobile.

EXPLANATION OF REFERENCE NUMERALS 1 vehicle seat
2 seat face part
21 seat face cushion
22 seat face recess
22a first recess
22b second recess
22c inclined wall face
3 back face part
31 back face cushion
32 back face recess
41 anchor (fixing member)
5 auxiliary seat
51 seat part
52 back part
54 lower face protrusion
54a first protrusion
54b second protrusion
54c inclined front face
55 rear face protrusion

What is claimed is:

1. A vehicle seat, comprising:
a seat face part;
a back face part; and
a fixing member for fixing an auxiliary seat, the fixing member being disposed between the seat face part and the back face part,
the seat face part comprising: a seat face recess capable of housing a lower face side of a seat part of the auxiliary seat; and a seat face cushion that is detachably attached to the seat face recess, and
the back face part comprising: a back face recess capable of housing a rear face side of a back part of the auxiliary seat; and a back face cushion that is detachably attached to the back face recess,
wherein the auxiliary seat comprises: a lower face protrusion that protrudes downward from the seat part and in a trapezoidal shape; and a rear face protrusion that protrudes rearward from the back part and in a trapezoidal shape, and
wherein the seat face recess and the back face recess each have a trapezoidal shape that reduces in size in a direction toward a bottom, corresponding to the trapezoidal shape of each of the lower face protrusion and the rear face protrusion.

2. The vehicle seat according to claim 1,
wherein the lower face protrusion of the auxiliary seat comprises: a first protrusion; and a second protrusion having a higher protrusion height than that of the first protrusion, and
wherein the seat face recess comprises: a first recess capable of housing the first protrusion; and a second recess capable of housing the second protrusion.

3. The vehicle seat according to claim 2,
wherein the second protrusion of the auxiliary seat is disposed on a rear side of the first protrusion, and
wherein the second recess is disposed on a rear side of the first recess.

4. The vehicle seat according to claim 3,
wherein the second protrusion comprises an inclined front face, which inclines rearward in a downward direction, on a front side, and
wherein the second recess comprises an inclined wall face, which inclines rearward in a direction toward the bottom, on a front side, corresponding to the inclined front face.

5. A method for mounting an auxiliary seat comprising: a seat part; a back part; and a connector connected to a fixing member, on a vehicle seat comprising: a seat face part; a back face part; and the fixing member for fixing the auxiliary seat, the fixing member being disposed between the seat face part and the back face part,     the seat face part of the vehicle seat comprising: a seat face recess capable of housing a lower face side of the seat part of the auxiliary seat; and a seat face cushion that is detachably attached to the seat face recess,     the back face part of the vehicle seat comprising: a back face recess capable of housing a rear face side of the back part of the auxiliary seat; and a back face cushion that is detachably attached to the back face recess, the method comprising:

detaching the seat face cushion and the back face cushion of the vehicle seat respectively from the seat face part and the back face part;

positioning to house the lower face side of the seat part of the auxiliary seat in the seat face recess of the seat face part;

connecting the connector of the auxiliary seat to the fixing member of the vehicle seat; and     positioning to house the rear face side of the back part of the auxiliary seat in the back face recess of the back face part of the vehicle seat,     wherein the auxiliary seat comprises: a lower face protrusion that protrudes downward from the seat part and in a trapezoidal shape; and a rear face protrusion that protrudes rearward from the back part and in a trapezoidal shape, and     wherein the seat face recess and the back face recess each have a trapezoidal shape that reduces in size in a direction toward a bottom, corresponding to the trapezoidal shape of each of the lower face protrusion and the rear face protrusion.

6. A structure for mounting an auxiliary seat comprising: a seat part; a back part; and a connector connected to a fixing member, on a vehicle seat comprising: a seat face part; a back face part; and the fixing member for fixing the auxiliary seat, the fixing member being disposed between the seat face part and the back face part,     the seat face part of the vehicle seat comprising a seat face recess capable of housing a lower face side of the seat part of the auxiliary seat,     the back face part of the vehicle seat comprising a back face recess capable of housing a rear face side of the back part of the auxiliary seat, and     the auxiliary seat being fixed to the vehicle seat by respectively housing the lower face side of the seat part and the rear face side of the back part of the auxiliary seat in the seat face recess and the back face recess of the vehicle seat and connecting the connector of the auxiliary seat to the fixing member of the vehicle seat,     wherein the auxiliary seat comprises: a lower face protrusion that protrudes downward from the seat part and in a trapezoidal shape; and a rear face protrusion that protrudes rearward from the back part and in a trapezoidal shape, and     wherein the seat face recess and the back face recess each have a trapezoidal shape that reduces in size in a direction toward a bottom, corresponding to the trapezoidal shape of each of the lower face protrusion and the rear face protrusion.

* * * * *